United States Patent
Spitsnogle

(10) Patent No.: US 10,836,241 B2
(45) Date of Patent: Nov. 17, 2020

(54) UTILITY VEHICLE

(71) Applicant: KAWASAKI JUKOGYO KABUSHIKI KAISHA, Hyogo (JP)

(72) Inventor: Dexter Spitsnogle, Lincoln, NE (US)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 2 days.

(21) Appl. No.: 16/351,765

(22) Filed: Mar. 13, 2019

(65) Prior Publication Data

US 2020/0290441 A1 Sep. 17, 2020

(51) Int. Cl.
| | |
|---|---|
| *B60J 5/04* | (2006.01) |
| *B60R 21/13* | (2006.01) |
| *B60J 1/08* | (2006.01) |
| *B60R 21/00* | (2006.01) |

(52) U.S. Cl.
CPC ............. *B60J 5/0487* (2013.01); *B60J 1/085* (2013.01); *B60J 5/0415* (2013.01); *B60R 21/13* (2013.01); *B60R 2021/0018* (2013.01)

(58) Field of Classification Search
CPC ......... B60J 5/0487; B60J 1/085; B60R 21/13; B60R 2021/132
USPC .................................................... 296/146.14
See application file for complete search history.

(56) References Cited

U.S. PATENT DOCUMENTS

| | | | |
|---|---|---|---|
| 2016/0185192 A1 | 6/2016 | Yamamoto et al. | |
| 2016/0332495 A1* | 11/2016 | Franker | B60G 11/48 |
| 2018/0229591 A1* | 8/2018 | Mazzarelli | B60J 1/14 |
| 2019/0232911 A1* | 8/2019 | Hisamura | B62D 27/02 |
| 2019/0248218 A1* | 8/2019 | Bell | B60J 5/065 |
| 2019/0329633 A1* | 10/2019 | Hisamura | B60J 5/0415 |
| 2020/0017153 A1* | 1/2020 | Barkey | B62D 23/005 |
| 2020/0079192 A1* | 3/2020 | Getzschman | B60J 5/0412 |

* cited by examiner

*Primary Examiner* — Jason S Morrow
(74) *Attorney, Agent, or Firm* — Wenderoth, Lind & Ponack, L.L.P.

(57) ABSTRACT

The utility vehicle has a door and a window unit detachably mounted to the door. The door includes an inner door panel, an outer door panel, and a door pipe frame supporting the inner door panel and the outer door panel. The window unit includes a window and a window unit pipe frame supporting the window. A plurality of downwardly extending pipe ends of the window unit pipe frame are inserted into a plurality of upwardly open pipe ends of the door pipe frame. The pipe ends of the window unit pipe frame are detachably fixed to the pipe ends of the door pipe frame using a locking device.

6 Claims, 8 Drawing Sheets

UTILITY VEHICLE

BACKGROUND OF THE INVENTION

1. Technical Field

The present invention relates to a utility vehicle.

2. Description of Related Art

Some utility vehicles are provided with doors as standard equipment or as an option, as disclosed in, for example, US 2016/0185192 A1.

However, the door of the utility vehicle disclosed in the above publication is not provided with a window. Some users may temporarily prefer a door with window in some cases.

SUMMARY

In view of this, an object of the present invention is to provide a detachable window in a door of a utility vehicle.

In order to achieve the above object, one aspect of the present invention provides a utility vehicle including:
a door; and
a window unit detachably mounted to the door,
the door having:
an inner door panel;
an outer door panel; and
a door pipe frame fixed to a body of the utility vehicle via a hinge and supporting the inner door panel and the outer door panel,
the window unit having:
a window; and
a window unit pipe frame supporting the window, wherein
a plurality of downwardly extending pipe ends of the window unit pipe frame are inserted into a plurality of upwardly open pipe ends of the door pipe frame, and
the pipe ends of the window unit pipe frame are detachably fixed to the pipe ends of the door pipe frame using a locking device.

In order to achieve the above object, another aspect of the present invention provides a utility vehicle including:
a door; and
a window unit detachably mounted to the door,
the door having:
an inner door panel;
an outer door panel; and
a door pipe frame fixed to a body of the utility vehicle via a hinge and supporting the inner door panel and the outer door panel,
the window unit having:
a window; and
a window unit pipe frame supporting the window, wherein
a plurality of upwardly extending pipe ends of the door pipe frame are inserted into a plurality of downwardly open pipe ends of the window unit pipe frame, and
the pipe ends of the window unit pipe frame are detachably fixed to the pipe ends of the door pipe frame using a locking device.

According to the aspects described above, it is possible to provide a detachable window in the door of the utility vehicle.

DETAILED DESCRIPTION

Figure 1:
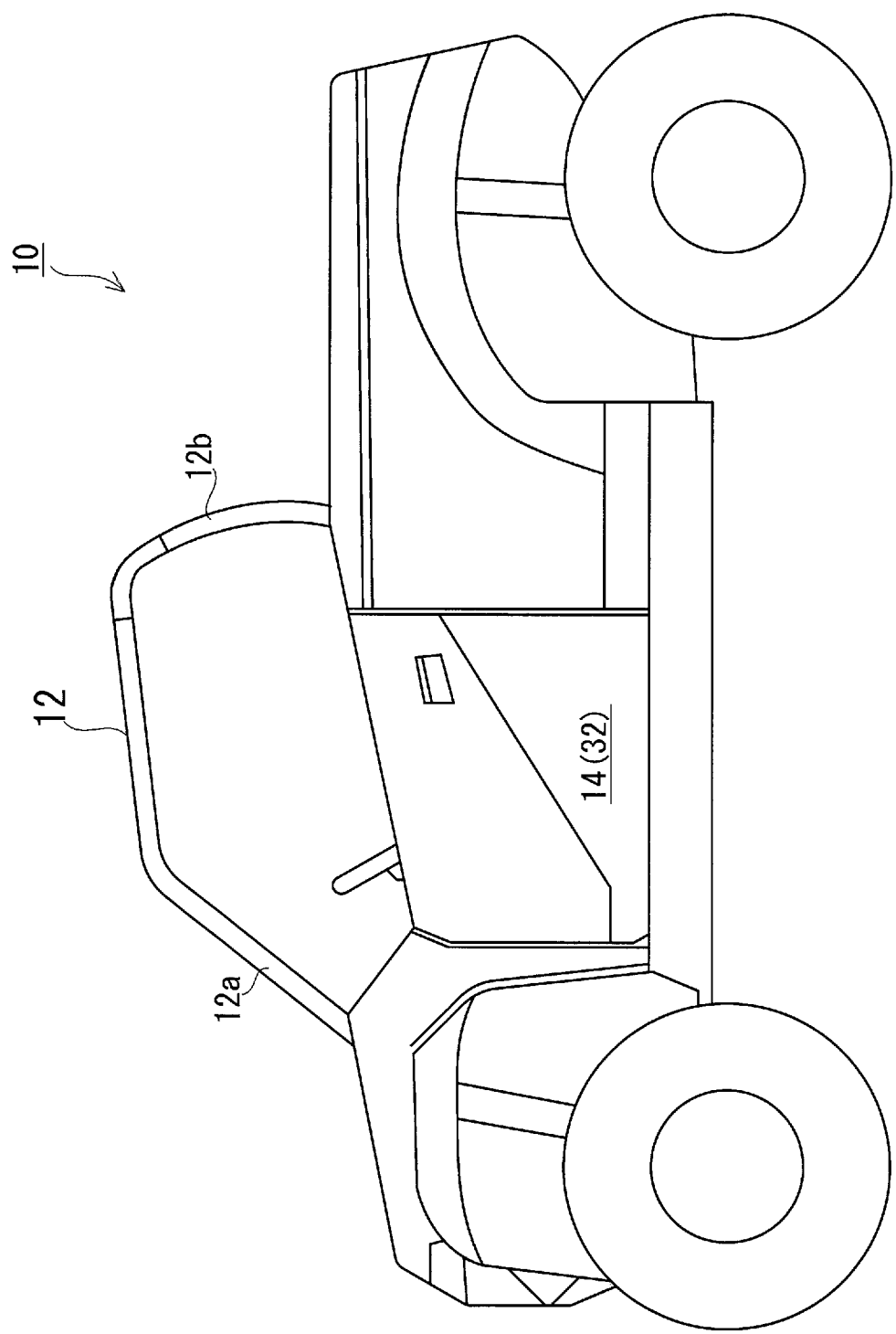
FIG. 1 is a side view of a utility vehicle according to an embodiment of the present invention.

A utility vehicle according to one aspect of the present invention includes a door, and a window unit detachably mounted to the door, the door having: an inner door panel; an outer door panel; and a door pipe frame fixed to a body of the utility vehicle via a hinge and supporting the inner door panel and the outer door panel, the window unit having: a window; and a window unit pipe frame supporting the window, wherein a plurality of downwardly extending pipe ends of the window unit pipe frame are inserted into a plurality of upwardly open pipe ends of the door pipe frame, and the pipe ends of the window unit pipe frame are detachably fixed to the pipe ends of the door pipe frame using a locking device.

A utility vehicle according to another aspect of the present invention includes a door, and a window unit detachably mounted to the door, the door having: an inner door panel; an outer door panel; and a door pipe frame fixed to a body of the utility vehicle via a hinge and supporting the inner door panel and the outer door panel, the window unit having: a window; and a window unit pipe frame supporting the window, wherein a plurality of upwardly extending pipe ends of the door pipe frame are inserted into a plurality of downwardly open pipe ends of the window unit pipe frame, and the pipe ends of the window unit pipe frame are detachably fixed to the pipe ends of the door pipe frame using a locking device.

For example, the utility vehicle may have a rollover protective structure (ROPS) including a front pillar and a rear pillar, and the window unit pipe frame may include a first pipe frame portion extending from the door pipe frame along the ROPS so as to terminate at the front pillar via the rear pillar, and a second pipe frame portion connected to the first pipe frame portion via a universal joint and fixed to the front pillar.

For example, the window unit may be provided with a cloth frame cover that supports the window made from a plastic sheet and is attached to the window unit pipe frame.

Hereinafter, a more detailed embodiment will be described with reference to FIGS. 1 to 7. FIGS. 1 to 7 show a utility vehicle according to an embodiment.

Note that more than necessary detailed descriptions will sometimes be omitted. For example, detailed descriptions for matters which have already been well known and redundant descriptions for substantially the same configurations may sometimes be omitted. This is to avoid unnecessary redundancy of the following description and to facilitate understanding of those skilled in the art.

In addition, the inventors of the present invention provide the accompanying drawings and the following description so that those skilled in the art can sufficiently understand the present disclosure, and they are not intended to limit the subject matter set forth in the claims.

In addition, the terms "front", "rear", "left" and "right" as used herein are based on a driver who is on board the utility vehicle and drives the utility vehicle.

As shown in FIG. 1, a utility vehicle 10 according to the embodiment includes an ROPS (Rollover Protective Structure) 12 for protecting occupants and doors 14 attached to the ROPS 12. Note that only the left door 14 is shown in FIG. 1.

The ROPS 12 is composed of a metal pipe frame and includes front pillars 12a and rear pillars 12b. Note that only the front pillar 12a and the rear pillar 12b on the left side are shown in FIG. 1.

Figure 2:
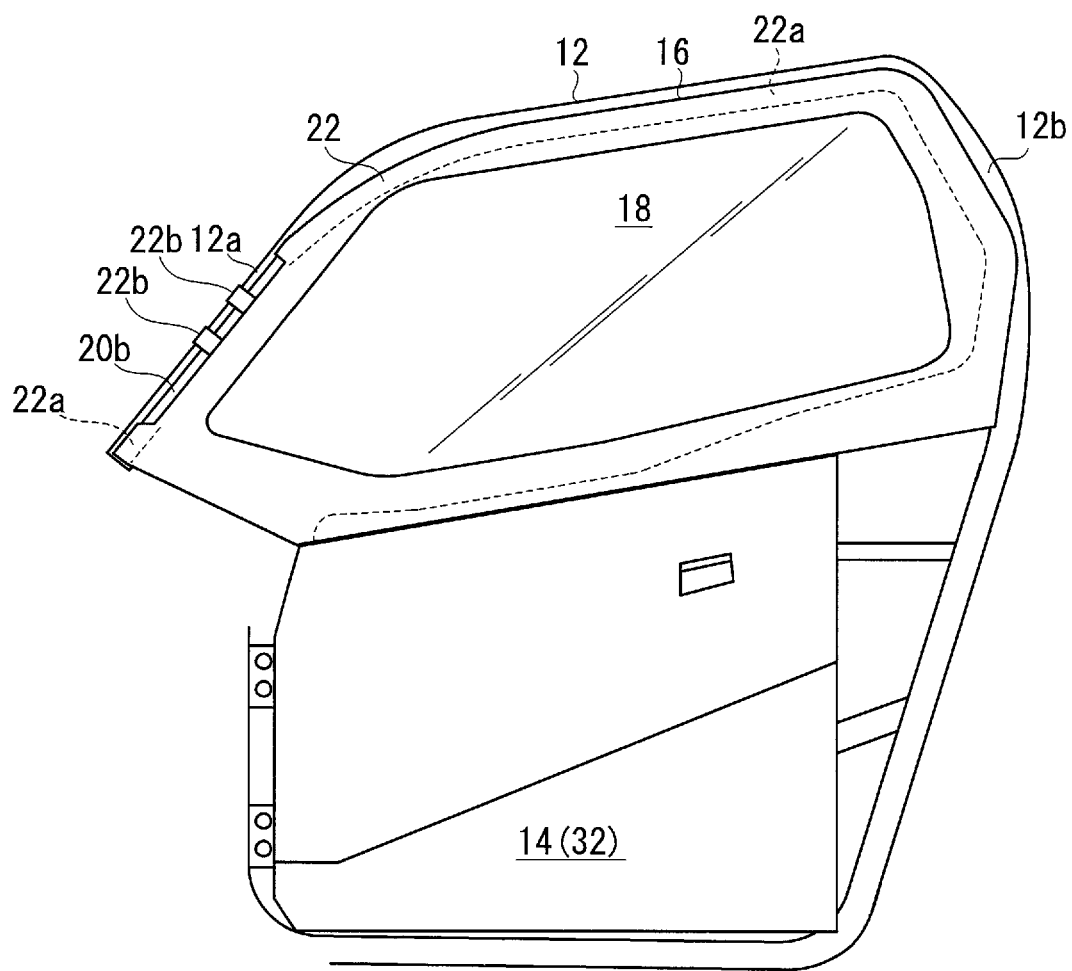
FIG. 2 is a view, as viewed from outside of the vehicle, showing a door to which a window unit is attached.
Figure 3:
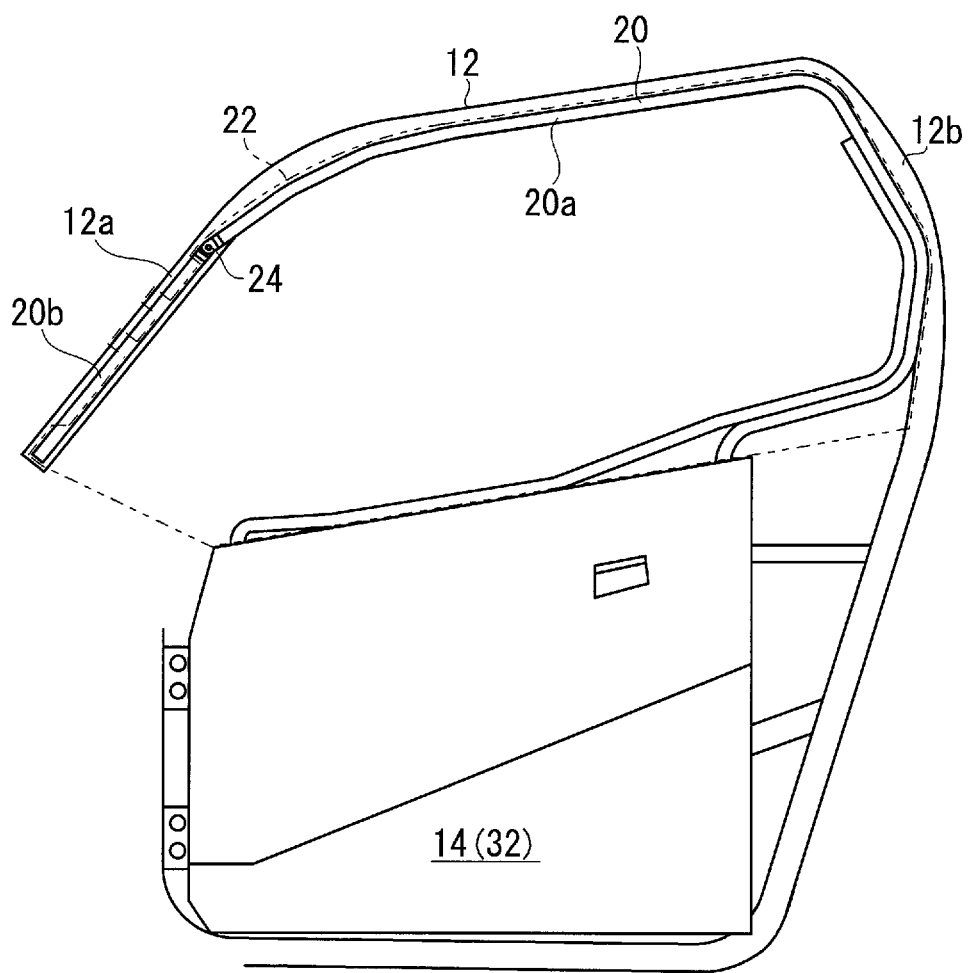
FIG. 3 is a view, as viewed from outside of the vehicle, showing a door to which a window unit pipe frame of the window unit is attached.

FIG. 2 shows the door to which a window unit is attached, as viewed from outside the vehicle. FIG. 3 shows the door to which a window unit pipe frame of the window unit is attached.

As shown in FIG. 2, the utility vehicle 10 according to the embodiment includes, as an option, a window unit 16 detachably mounted to the door 14. The door 14 itself may be detachably mounted to a body of the utility vehicle 10 as an option.

In the embodiment, the window unit 16 includes a window 18, a window unit pipe frame 20 supporting the window 18, and a frame cover 22 that connects the window 18 and the window unit pipe frame 20, as shown in FIGS. 2 and 3.

In the embodiment, the window 18 of the window unit 16 is made of a deformable transparent material such as a transparent plastic sheet. The window unit pipe frame 20 is made of a metal pipe.

The frame cover 22 is made of a deformable cloth, for example, a nylon cloth. The frame cover 22 entirely supports the outer peripheral edge of the window 18. The frame cover 22 and the window 18 are bonded by, for example, an adhesive.

The frame cover 22 also includes a tubular portion 22a into which the window unit pipe frame 20 is inserted. The frame cover 22 is attached to the window unit pipe frame 20 by inserting the window unit pipe frame 20 into the tubular portion 22a. The frame cover 22 may be attached to the window unit pipe frame 20 by, for example, winding a hook-and-loop fastener or a string attached to the frame cover 22 around the window unit pipe frame 20. Further, the frame cover 22 (and the window 18) may be detachable from the window unit pipe frame 20.

As shown in FIG. 3, the window unit pipe frame 20 of the window unit 16 has a first pipe frame portion 20a extending along a frame of the ROPS 12 so as to terminate at the front pillar 12a via the rear pillar 12b of the ROPS 12, and a second pipe frame portion 20b fixed to the front pillar 12a. The second pipe frame portion 20b extends along the front pillar 12a. The first pipe frame portion 20a and the second pipe frame portion 20b are connected via a universal joint 24.

The first pipe frame portion 20a of the window unit pipe frame 20 of the window unit 16 has substantially a "C" shape and detachably fixed to the door 14 as will be described in detail later.

On the other hand, the second pipe frame portion 20b of the window unit pipe frame 20 is linear and is detachably fixed to the front pillar 12a of the ROPS 12. Specifically, as shown in FIG. 2, a plurality of hook-and-loop fasteners 22b provided on the frame cover 22 are wound around both the front pillar 12a and the second pipe frame portion 20b that are in parallel and in contact with each other. As a result, the second pipe frame portion 20b is rotatable about the front pillar 12a and is detachably fixed to the front pillar 12a.

The first pipe frame portion 20a of the window unit pipe frame 20 is fixed to the door 14, while the second pipe frame portion 20b is fixed to the front pillar 12a. Therefore, even when the door 14 is opened and closed, the first pipe frame portion 20a and the second pipe frame portion 20b are connected via the universal joint 24 so that the connection between them is maintained.

Figure 4:
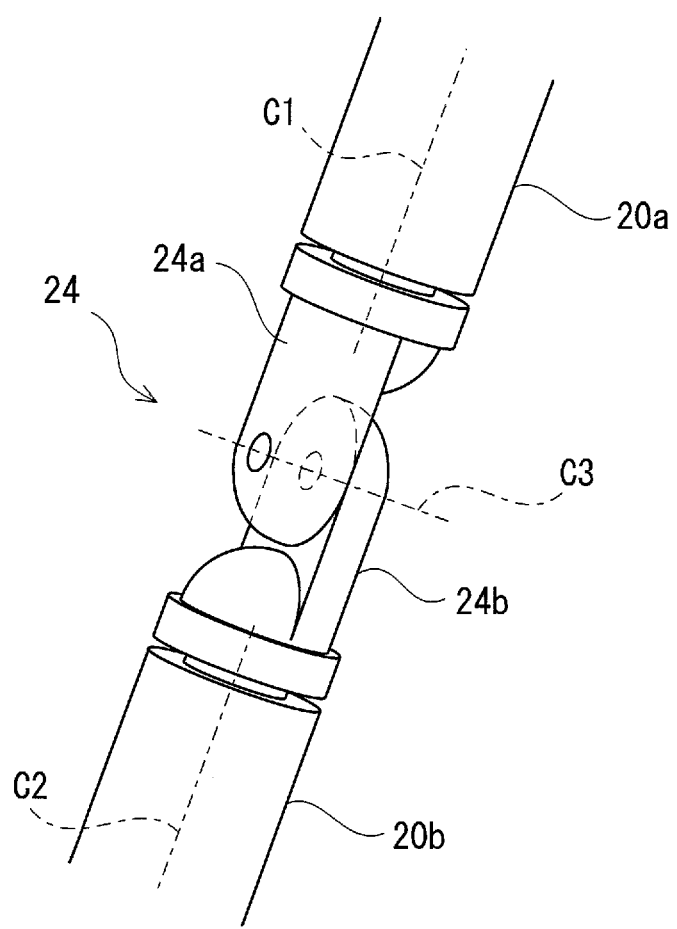
FIG. 4 is a perspective view of a universal joint.

FIG. 4 is a perspective view of the universal joint.

As shown in FIG. 4, the universal joint 24 includes a first joint portion 24a attached to the distal end of the first pipe frame portion 20a and a second joint portion 24b attached to the distal end of the second pipe frame portion 20b. The first joint portion 24a of the universal joint 24 is connected to the first pipe frame portion 20a so as to be rotatable, with respect to the first pipe frame portion 20a, about a rotation center line C1 extending in the extending direction of the first pipe frame portion 20a (a part near the distal end thereof). The second joint portion 24b is attached to the second pipe frame portion 20b so as to be rotatable about a rotation center line C2 extending in the extending direction of the second pipe frame portion 20b. The first joint portion 24a and the second joint portion 24b are connected to each other so as to be mutually rotatable about a rotation center line C3 orthogonal to both the rotation center line C1 and the rotation center line C2.

When the first pipe frame portion 20a and the second pipe frame portion 20b are connected to each other via the universal joint 24 described above, a user can smoothly open and close the door 14 to which the window unit 16 (that is, the window unit pipe frame 20) is attached with substantially the same force as the force for opening and closing the door 14 to which the window unit 16 is not attached.

As shown in FIG. 2, the second pipe frame portion 20b of the window unit pipe frame 20 is rotatably attached to the front pillar 12a using hook-and-loop fasteners 22b. This also allows the user to smoothly open and close the door 14 to which the window unit 16 (that is, the window unit pipe frame 20) is attached, with substantially the same force as the force for opening and closing the door 14 to which the window unit 16 is not attached. Further, use of the hook-and-loop fasteners 22b enables fixing the second pipe frame portion 20b to the front pillar 12a without providing any treatment to the front pillar 12a.

Furthermore, the window 18 and the frame cover 22 of the window unit 16 are deformable. This also allows the user to smoothly open and close the door 14 to which the window unit 16 (that is, the window unit pipe frame 20) is attached, with substantially the same force as the force for opening and closing the door 14 to which the window unit 16 is not attached.

Furthermore, since the window 18 and the frame cover 22 of the window unit 16 are made from a lightweight material (compared to a metal material), the user can smoothly open and close the door 14 to which the window unit 16 (that is, the window unit pipe frame 20) is attached, with substantially the same force as the force for opening and closing the door 14 to which the window unit 16 is not attached.

The window 18 and the frame cover 22 of the window unit 16 are made of a lightweight deformable material. Therefore, the window unit 16 may rattle (vibrate) in the width direction of the vehicle while the utility vehicle 10 is traveling. In order to suppress such vibration, the window unit 16 is fixed to both the door 14 and the front pillar 12a of the ROPS 12.

Next, attachment of the window unit 16, that is, the window unit pipe frame 20, to the door 14 will be described.

Figure 5:
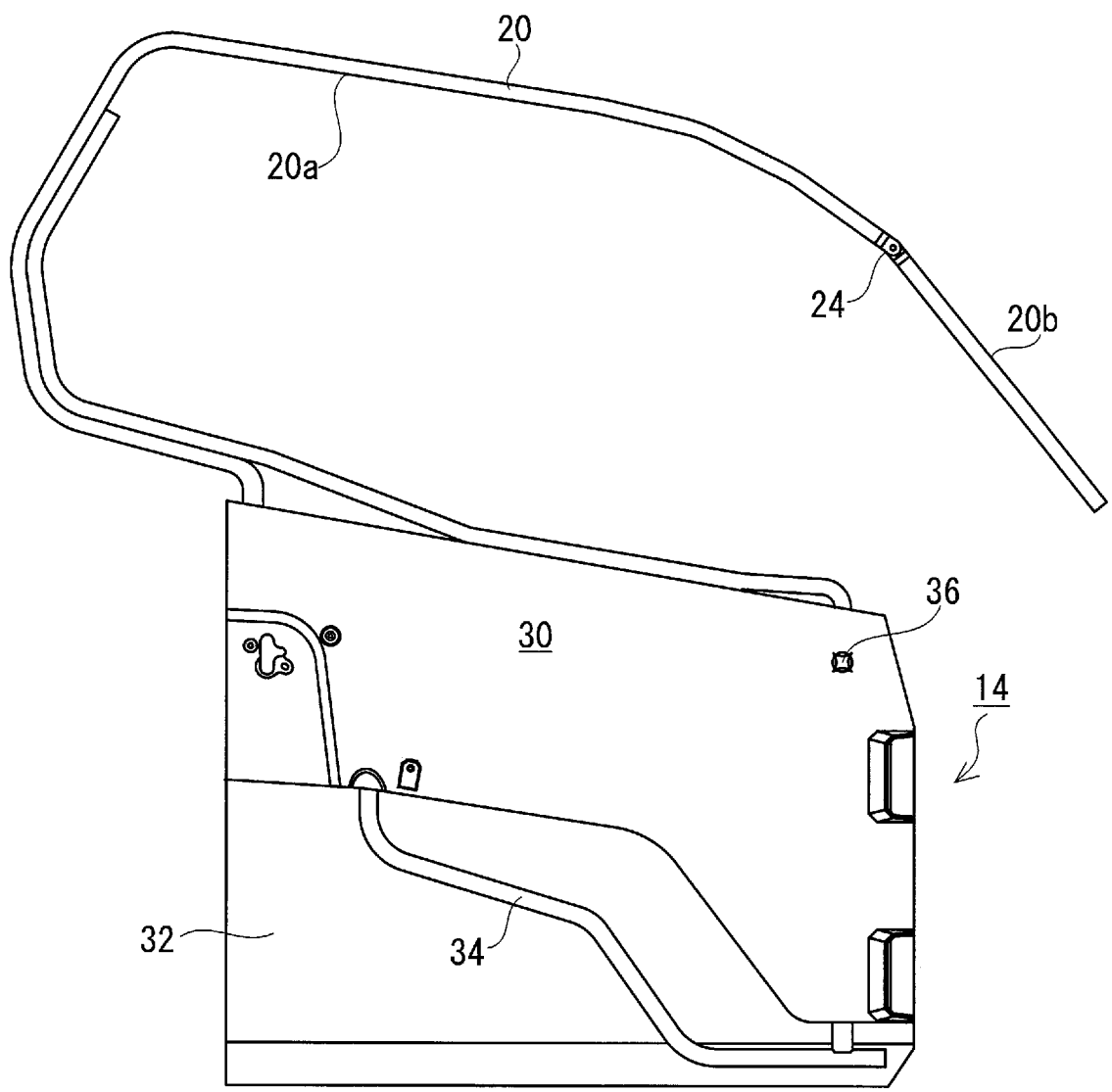
FIG. 5 is a view, as viewed from inside of the vehicle, showing the door to which the window unit pipe frame is attached.
Figure 6:
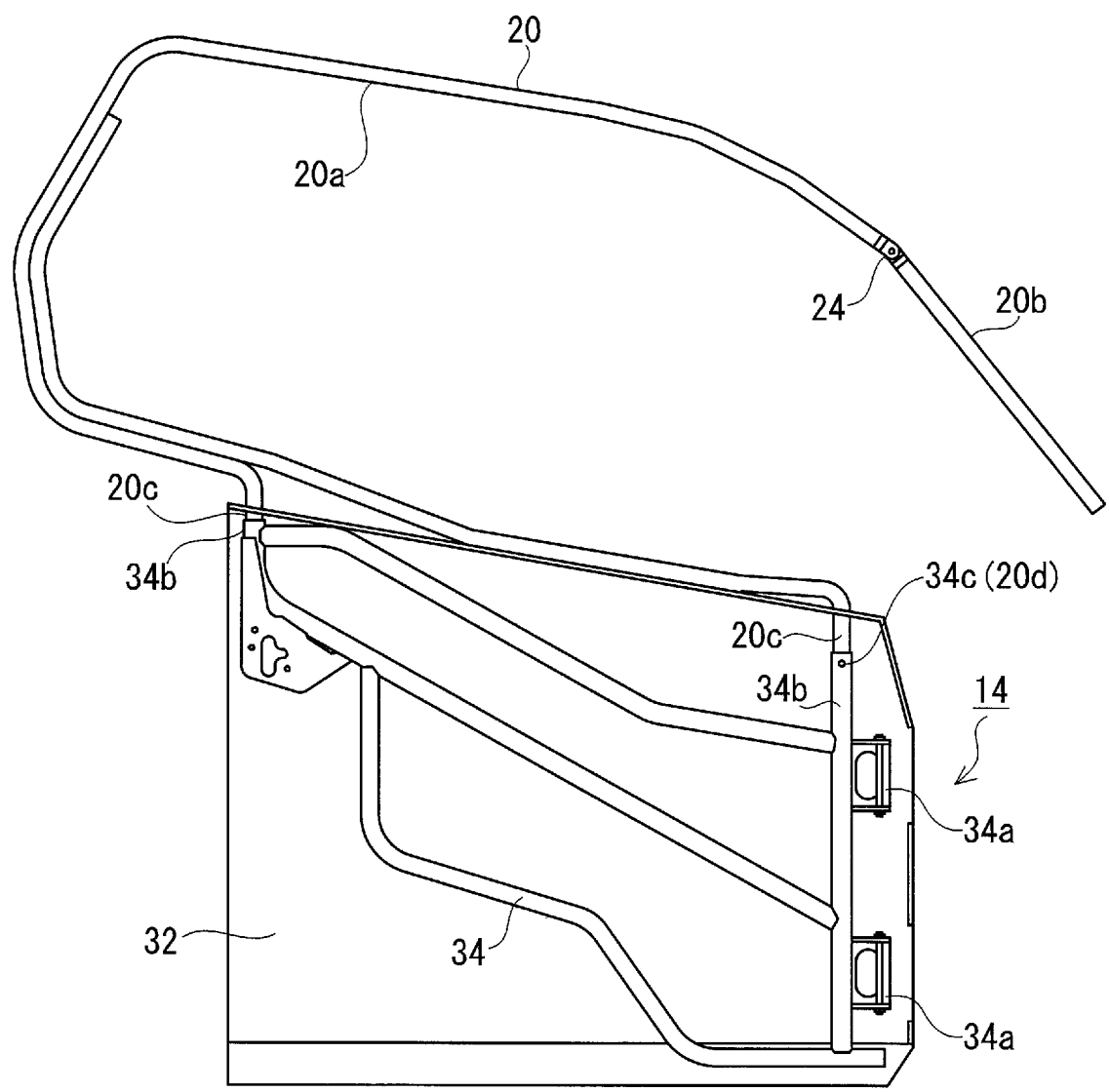
FIG. 6 is a view, as viewed from inside of the vehicle, showing a door to which the window unit pipe frame is attached and from which an inner door panel is removed.
Figure 7:
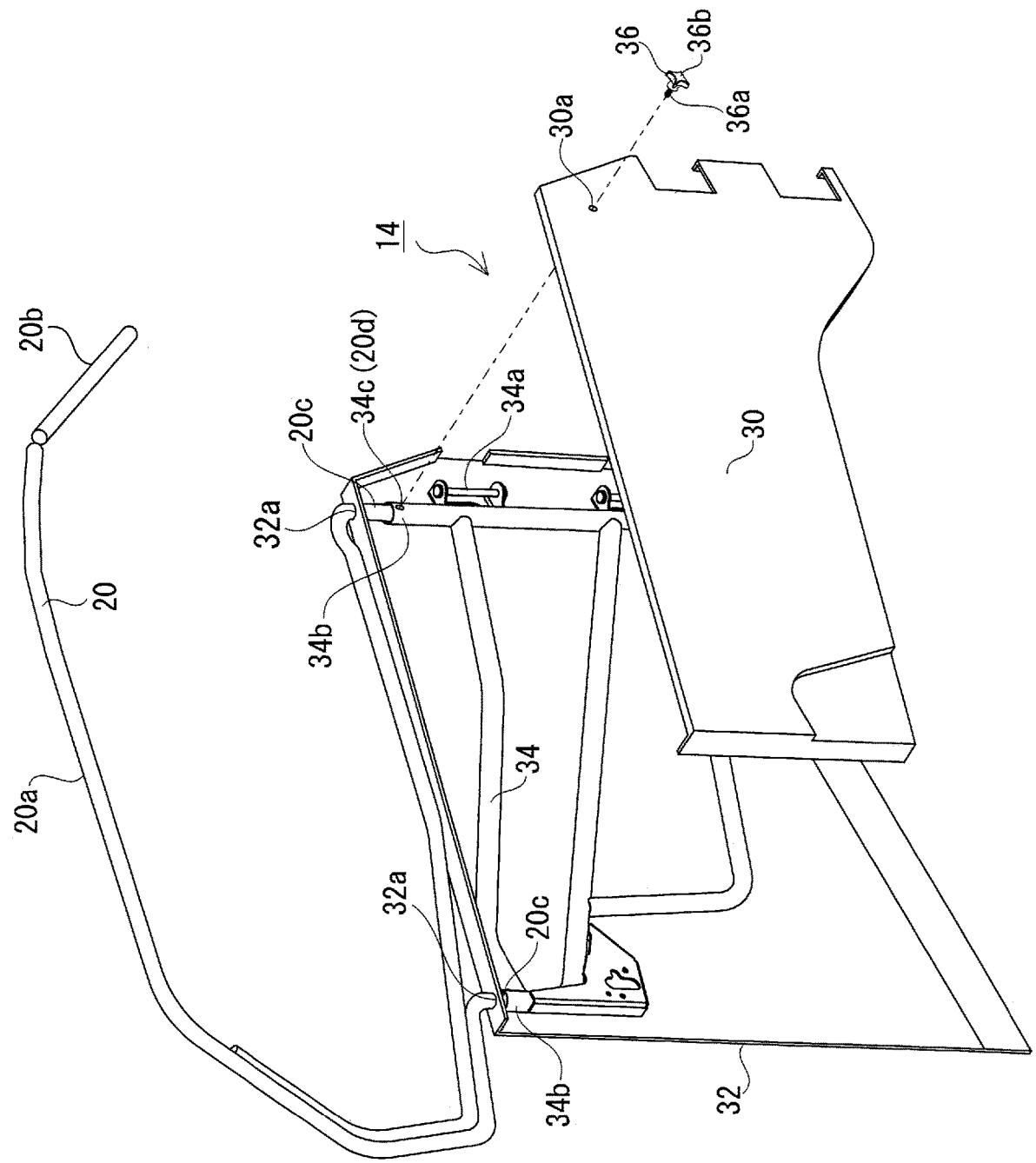
FIG. 7 is an exploded perspective view of a door to which the window unit pipe frame is attached.

FIG. 5 shows the door to which the window unit pipe frame is attached, as viewed from inside the vehicle. FIG. 6 shows the door to which the window unit pipe frame is attached and from which the inner door panel is removed, as viewed from inside of the vehicle. FIG. 7 is an exploded perspective view of the door to which the window unit pipe frame is attached.

As shown in FIGS. 5 to 7, the door 14 to which the window unit 16 (the window unit pipe frame 20) is to be attached includes an inner door panel 30 positioned on a vehicle interior side, an outer door panel 32 positioned on a vehicle exterior side, and a door pipe frame 34 supporting the inner door panel 30 and the outer door panel 32.

The inner door panel 30 and the outer door panel 32 are made of a resin material. In the embodiment, the inner door panel 30 overlaps only a portion of the outer door panel 32 (a portion excluding the rear lower portion), so that a portion of the door pipe frame 34 is exposed inside the vehicle, as shown in FIG. 5.

The door pipe frame 34 is constituted by a metal pipe. Further, the door pipe frame 34 is provided with a hinge 34a and is rotatably fixed to the body of the utility vehicle 10 via the hinge 34a. Further, the door pipe frame 34 is sandwiched between the inner door panel 30 and the outer door panel 32, and the door panels 30 and 32 are fixed to the portion of the door pipe frame 34 sandwiched between them.

The window unit pipe frame 20 of the window unit 16 is fixed not to the inner door panel 30 and the outer door panel 32 of the door 14 but to the door pipe frame 34.

Specifically, as shown in FIGS. 6 and 7, the window unit pipe frame 20 of the window unit 16 has a plurality of pipe ends 20c extending downward from the first pipe frame portion 20a. In contrast, the door pipe frame 34 has a plurality of upwardly open pipe ends 34b. The pipe ends 20c of the window unit pipe frame 20 are inserted into the pipe ends 34b of the door pipe frame 34. Thus, the window unit pipe frame 20 and the door pipe frame 34 are connected.

One of the pipe ends 20c of the window unit pipe frame 20 is fixed to the corresponding pipe end 34b of the door pipe frame 34 using locking device 36. As shown in FIG. 7, the locking device 36 includes an external thread portion 36a and a knob portion 36b. The pipe end 34b of the door pipe frame 34 is formed with an internal threaded hole 34c which is a through hole and which is to be engaged with the external thread portion 36a of the locking device 36. The pipe end 20c of the window unit pipe frame 20 is formed with a through hole 20d, and the distal end of the external thread portion 36a of the locking device 36 passing through the internal threaded hole 34c of the pipe end 34b of the door pipe frame 34 passes through the through hole 20d. With the locking device 36 thus configured, the window unit 16, that is, the window unit pipe frame 20, is detachably fixed to the door pipe frame 34.

The pipe ends 34b of the door pipe frame 34 are located between the inner door panel 30 and the outer door panel 32. In order to insert the pipe ends 20c of the window unit pipe frame 20 into the pipe ends 34b of the door pipe frame 34 without removing the inner door panel 30 from the door 14, the outer door panel 32 is formed with through holes 32a through which the pipe ends 20c of the window unit pipe frame 20 pass, as shown in FIG. 7.

In addition, in order to fix the pipe ends 20c of the window unit pipe frame 20 to the pipe ends 34b of the door pipe frame 34 without removing the inner door panel 30 from the door 14, the inner door panel 30 is formed with through hole 30a through which the external thread portion 36a of the locking device 36 pass. That is, the window unit 16 (that is, the window unit pipe frame 20) can be easily attached to and detached from the door 14 (that is, the door pipe frame 34) by rotating the knob portion 36b of the locking device 36 located on the vehicle interior side with respect to the inner door panel 30.

According to the embodiment described above, it is possible to provide a detachable window in the door of the utility vehicle.

While the present invention has been described with reference to the above embodiment, the present invention is not limited thereto.

For example, in the above embodiment, the pipe ends 20c of the window unit pipe frame 20 of the window unit 16 are inserted into the pipe ends 34b of the door pipe frame 34 of the door 14, as shown in FIG. 6. However, the embodiment of the present invention is not limited thereto.

Figure 8:
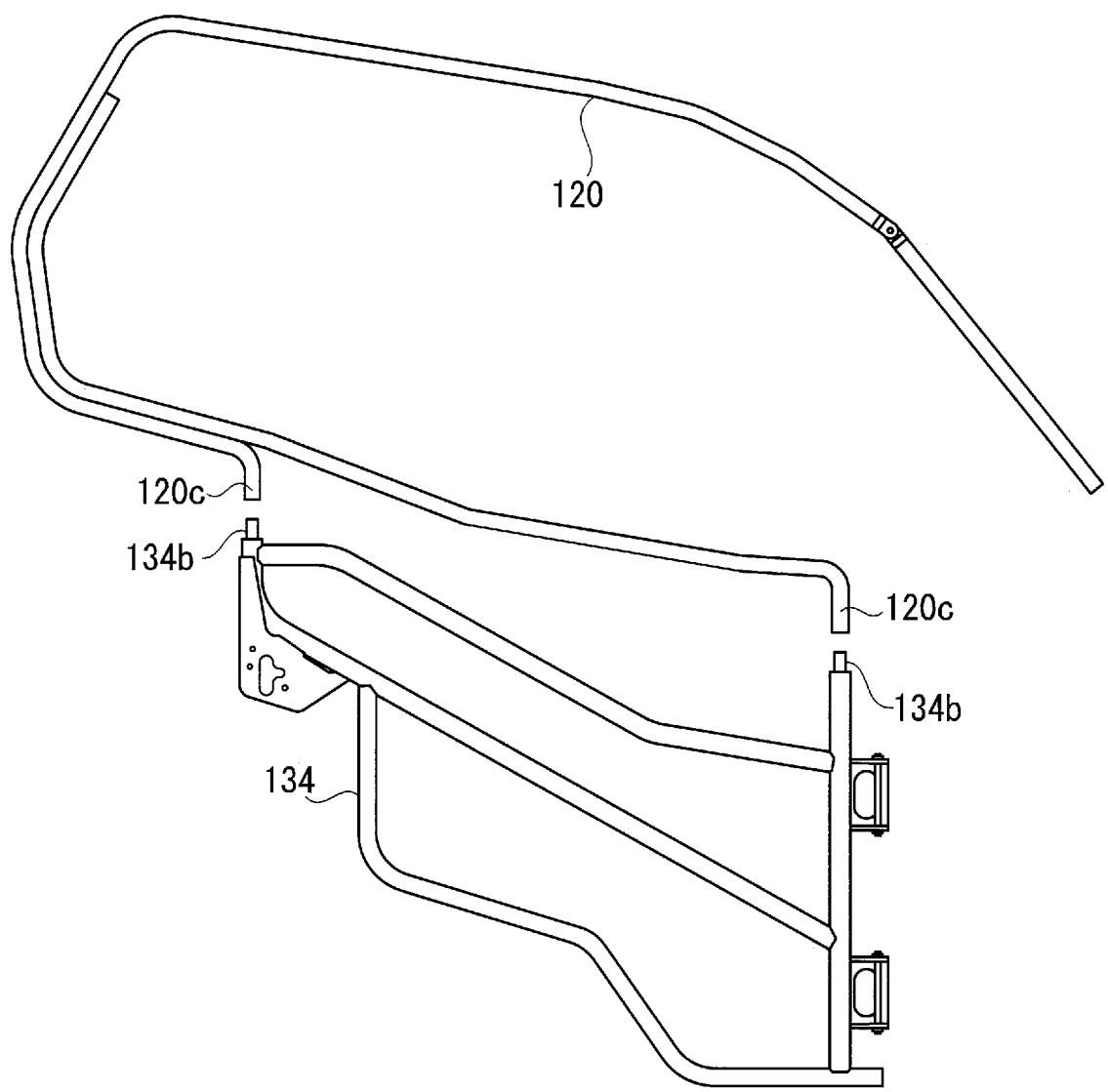
FIG. 8 is a view showing attachment of a window unit according to another embodiment.

FIG. 8 shows attachment of a window unit according to another embodiment.

As shown in FIG. 8, a window unit pipe frame 120 of the window unit according to another embodiment includes a plurality of downwardly open pipe ends 120c. On the other hand, a door pipe frame 134 of a door has pipe ends 134b which extend upward and which are to be inserted into the pipe ends 120c of the window unit pipe frame 120. The pipe ends 120c are fixed to the pipe ends 134b using locking devices in the same manner as in the abovementioned embodiment.

Further, in the above embodiment, the window 18 and the frame cover 22 of the window unit 16 are made of a deformable material, as shown in FIG. 2. However, the embodiment of the present invention is not limited thereto. If the window unit is not fixed to the front pillar of the ROPS, a window made from a thick acrylic plate, for example, may be attached to the window unit pipe frame using a screw, for example.

As described above, the embodiment has been described as an example of the technique in the present invention. For this purpose, the accompanying drawings and detailed description are provided. Therefore, components in the accompanying drawings and the detailed description may include not only components essential for solving problems, but also components that are provided to illustrate the above-described technique and are not essential for solving problems. Therefore, such inessential components should not be readily construed as being essential based on the fact that such inessential components are shown in the accompanying drawings or mentioned in the detailed description.

Furthermore, since the embodiment described above is intended to illustrate the technique in the present invention, various changes, substitutions, additions, omissions, and the like can be made within the scope of the claims and the scope of equivalents thereof.

The invention claimed is:

1. A utility vehicle comprising:
a door; and
a window unit detachably mounted to the door,
the door having:
   an inner door panel;
   an outer door panel; and a door pipe frame fixed to a body of the utility vehicle via a hinge and supporting the inner door panel and the outer door panel, the window unit having:
a window; and
a window unit pipe frame supporting the window, wherein a plurality of downwardly extending pipe ends of the window unit pipe frame are inserted into a plurality of upwardly open pipe ends of the door pipe frame, and the pipe ends of the window unit pipe frame are detachably fixed to the pipe ends of the door pipe frame using a locking device.

2. A utility vehicle comprising:
a door; and
a window unit detachably mounted to the door,
the door having:
an inner door panel;
an outer door panel; and
a door pipe frame fixed to a body of the utility vehicle via a hinge and supporting the inner door panel and the outer door panel, the window unit having:
a window; and
a window unit pipe frame supporting the window, wherein a plurality of upwardly extending pipe ends of the door pipe frame are inserted into a plurality of downwardly open pipe ends of the window unit pipe frame, and the pipe ends of the window unit pipe frame are detachably fixed to the pipe ends of the door pipe frame using a locking device.

3. The utility vehicle according to claim 1, comprising a rollover protective structure (ROPS) including a front pillar and a rear pillar, wherein the window unit pipe frame includes:
a first pipe frame portion extending from the door pipe frame to the rear pillar and further extending along the ROPS from the rear pillar to the front pillar; and
a second pipe frame portion connected to the first pipe frame portion via a universal joint and fixed to the front pillar.

4. The utility vehicle according to claim 1, wherein the window unit is provided with a cloth frame cover that supports the window made from a plastic sheet and is attached to the window unit pipe frame.

5. The utility vehicle according to claim 2, comprising a rollover protective structure (ROPS) including a front pillar and a rear pillar, wherein the window unit pipe frame includes:
a first pipe frame portion extending from the door pipe frame to the rear pillar and further extending along the ROPS from the rear pillar to the front pillar; and
a second pipe frame portion connected to the first pipe frame portion via a universal joint and fixed to the front pillar.

6. The utility vehicle according to claim 2, wherein the window unit is provided with a cloth frame cover that supports the window made from a plastic sheet and is attached to the window unit pipe frame.

* * * * *